United States Patent [19]

Boissicat

[11] 3,727,757

[45] Apr. 17, 1973

[54] DIP HANDLING APPARATUS

[76] Inventor: Claude M. Boissicat, 1010 Lois Ave., Sunnyvale, Calif. 94087

[22] Filed: June 12, 1972

[21] Appl. No.: 261,671

[52] U.S. Cl. ..........................209/73, 209/74, 209/81, 221/105

[51] Int. Cl. ............................B07c 1/02, B07c 5/344

[58] Field of Search........................209/73, 74, 75, 81; 221/105, 103, 104

[56] References Cited

UNITED STATES PATENTS

| | | | |
|---|---|---|---|
| 3,198,330 | 8/1965 | Weisler | 209/81 R X |
| 3,655,041 | 4/1972 | Baker | 209/81 R X |

*Primary Examiner*—Richard A. Schacher
*Attorney*—Thomas E. Schatzel et al.

[57] ABSTRACT

DIP handling apparatus including a pair of input magazines for containing DIPs to be tested and sorted; a track for serially receiving the DIPs at one end, transporting them in astraddle fashion and subsequently discharging them at the opposite end, an input magazine selecting mechanism for enabling a particular one of the input magazines to be unloaded onto the track; a test mechanism disposed along the track for engaging the electrical conductors of a DIP located along the track at a test position; an indexing mechanism disposed along the track for sequentially locating the DIPs at the test position; a plurality of output magazines for receiving the DIPs after they are tested; a sorting mechanism disposed between the opposite end of the track and the output magazines for selectively transporting the tested DIP to a particular output magazine; and logic circuitry for applying test signals to the DIPs as they are located in the test position, and for developing signals to control the various operative mechanisms of the apparatus.

19 Claims, 12 Drawing Figures

DIP HANDLING APPARATUS

BACKGROUND OF THE INVENTION

1. Field of the Invention

The present invention relates generally to electronic component handling apparatus and more particularly to a handling apparatus for facilitating the testing and sorting of electronic circuit components contained in potted packages referred to in the art as DIPs (dual in-line packages).

2. Description of the Prior Art

Numerous DIP handling devices of the type toward which the present invention is directed are provided in the prior art. However, each of the prior art devices include features which limit the rate at which a plurality of DIPs may be handled. For example, in one prior art device, each DIP is sequentially displaced out of its transporting path by pneumatic means which drive it into engagement with a set of test probes and then returned to the path for sorting. The time required to displace the DIP away from the transport path for testing and then to return it to the transport path amounts to a substantial portion of the test sequence and thus limits the operational speed of the handling device.

Other prior art apparatus utilize various turret-like mechanisms which rotate in transporting each DIP into a test position and then into an awaiting receptacle. Such apparatus obviously requires the use of some type of memory circuitry to enable the DIP to be discharged from the transporting turret as the particular storage location passes a selected output magazine.

SUMMARY OF THE PRESENT INVENTION

It is therefore a primary object of the present invention to provide a DIP handling apparatus which does not require that the DIPs be displaced from the transport path for testing and which does not require the use of a turret-like sorting structure to place the tested DIP in a particular collection receptacle.

Briefly, the present invention includes a pair of input magazines for containing DIPs to be tested and sorted; a track for serially receiving the DIPs at one end, transporting them in astraddle fashion and subsequently discharging them at the opposite end, an input magazine selecting mechanism for enabling a particular one of the input magazines to be unloaded onto the track; a test mechanism disposed along the track for engaging the electrical conductors of a DIP located along the track at a test position; an indexing mechanism disposed along the track for sequentially locating the DIPs at the test position; a plurality of output magazines for receiving the DIPs after they are tested; a sorting mechanism disposed between the opposite end of the track and the output magazines for selectively transporting the tested DIP to a particular output magazine; and logic circuitry for applying test signals to the DIPs as they are located in the test position, and for developing signals to control the various operative mechanisms of the apparatus.

Among the many advantages of the present invention is that the DIPs are caused to move solely under the force of gravity along a linear path from the input magazines to a selected output magazines. In addition, the time required to contact the leads of the DIP under test is minimized since the DIP is tested in place on the track. Moreover, immediately following the test sequence, the DIP is allowed to drop directly into a selected output magazine without being temporarily stored in an intermediate device.

These and other advantages of the present invention will no doubt become apparent to those of ordinary skill in the art after having read the following detailed disclosure of a preferred embodiment which is illustrated in the several figures of the drawing.

IN THE DRAWING

DETAILED DESCRIPTION OF THE PREFERRED EMBODIMENT

Figures 1, 2:
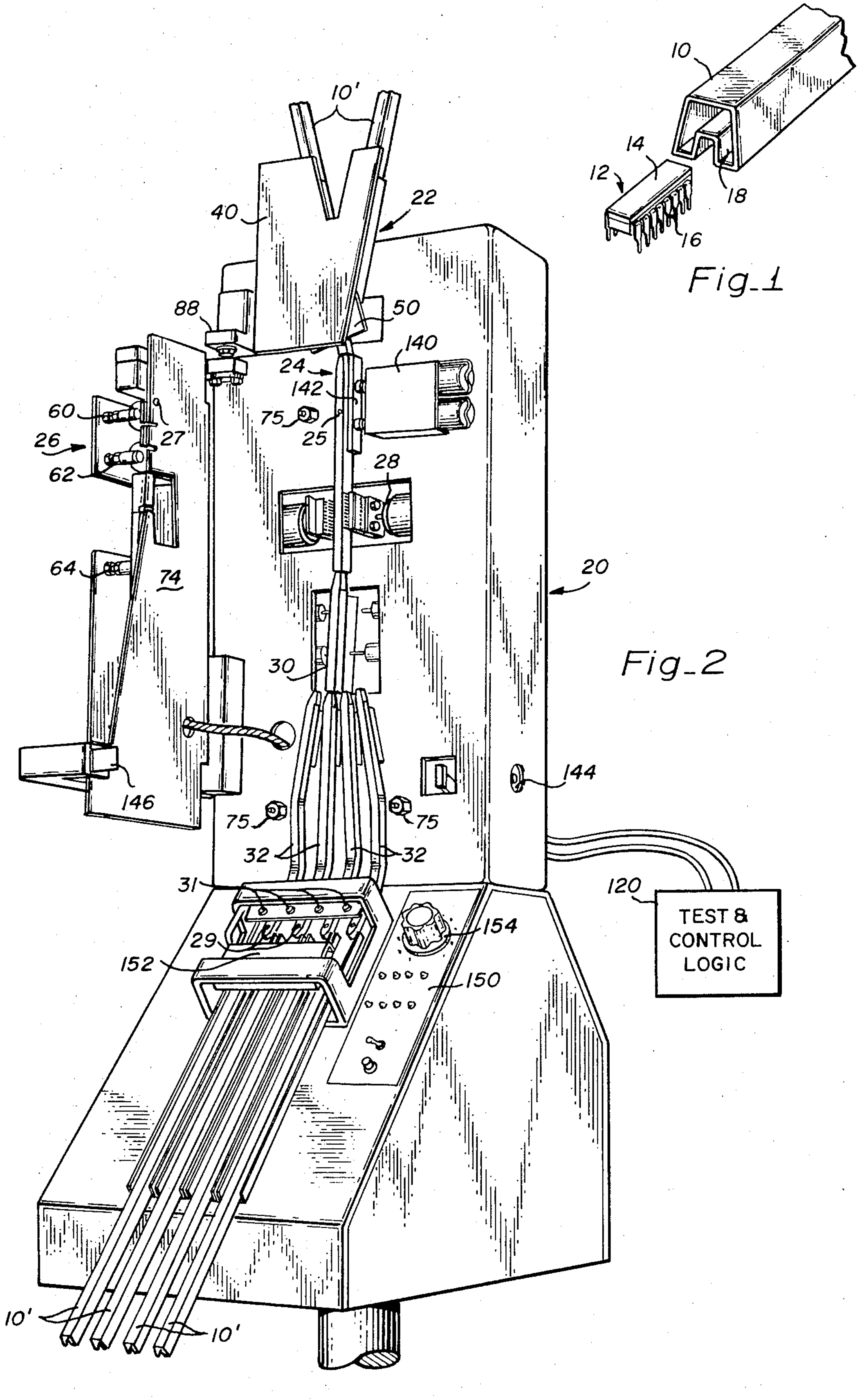
FIG. 1 is an illustration of a standard DIP and packaging magazine.
FIG. 2 is a perspective view of a preferred embodiment of a sorting apparatus in accordance with the present invention.

Referring now to FIG. 1 of the drawing, there is shown a portion of a shipping magazine 10 and a DIP 12 of the type to be handled by the preferred embodiment of the present invention illustrated in FIG. 2. The DIP 12 includes a generally rectangular body portion 14 from which a plurality of leads 16 project from each side. Each set of leads 16 is bent downwardly as indicated. The magazine 10 is shaped to provide an internal track-like ridge 18 upon which the DIPs 12 are positioned in astraddle fashion for shipping and storage. Magazine 10 is usually made of a transparent plastic material and is normally long enough to contain 25 or more DIPs.

As illustrated in FIG. 2, the preferred embodiment includes an upright standing chassis 20 which carries an input magazine selector 22, a main track 24, an indexing mechanism 26 shown in a swung open position, a testhead mechanism 28, a sorting mechanism 30, and four output tracks 32. A pair of input magazines 10' are inserted into position above input magazine selector 22, and four output magazines 10'' are shown coupled to the four output tracks 32.

Figure 3:
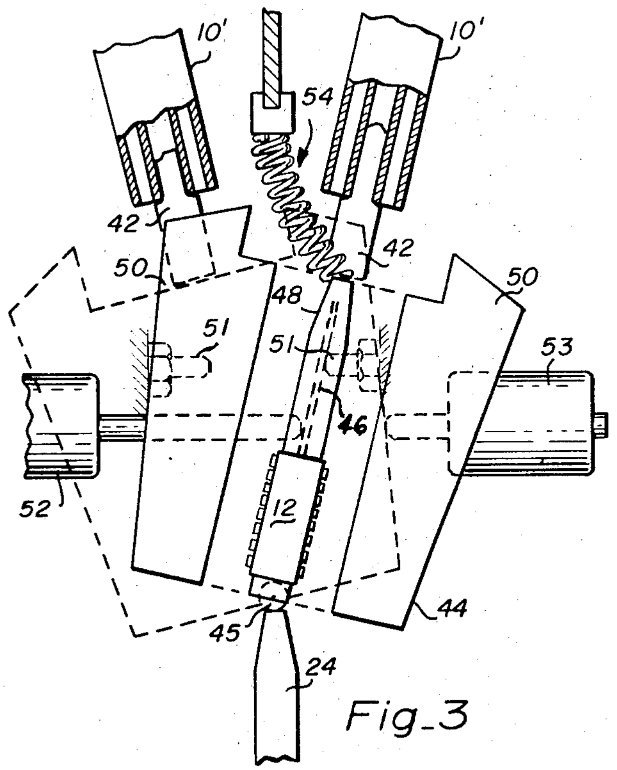
FIG. 3 is a front view illustrating an input magazine selecting mechanism of the type used in the embodiment of FIG. 2.
Figure 4:
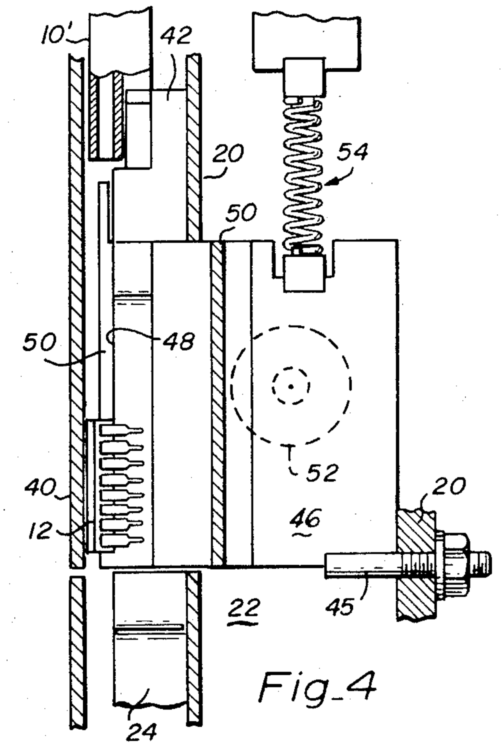
FIG. 4 is a side view further illustrating the input magazine selecting mechanism shown in FIG. 3.

In FIG. 3 of the drawing, a front view of the input magazine selector 22 is shown with the coverplate 40 (FIG. 2) removed. A side view of the same mechanism is shown in FIG. 4 with the coverplate 40 in place. Affixed to the chassis 20 and aligned at an angle relative to each other are a pair of short input track stubs 42 which have an upper front portion which is of narrow cross section for receiving one end of the input magazines 10'. Pivotally disposed beneath the two stubs 42 and adapted to rotate about the axis of a shaft 45 is the principal component 44 of the selector mechanism 22.

Component 44 includes a vertically disposed plate 46 which is affixed to the shaft 45 which is in turn rotatably mounted to a portion of chassis 20. Affixed to the frontmost edge of plate 46 is a short section of selector track 48 which is tapered at its upper end to facilitate reception of a DIP 12 from track stubs 42. Affixed to either side of plate 46 and extending first forwardly and then laterally are a pair of masking flanges 50 which, as indicated in FIG. 3, mask or block off one of the track stubs 42 when the selector track 48 is aligned with the other stub. This of course prevents DIPs contained in the magazine mated with the blocked track stub 42 from emptying out of that magazine. However, the DIPs contained in the other magazine are permitted to flow freely onto the selector track 48 and thence onto the main track 24.

The selective positioning of selector track 44 is accomplished by means of a pair of solenoid actuators 52 and 53, an over-center spring detent member 54, and a pair of adjustable stops 51. The stops are positioned so that when one of the actuators 52–53 is unenergized and the other is energized, selector track 44 is driven into alignment with the nearest track stub 42. As indicated in FIG. 2 and 4, the cover plate 40 is disposed in spaced apart relationship with the selector mechanism and serves to provide a guide on the near side for the DIPs 12 as they pass along the track formed by stubs 42 and selector track 48.

Figure 5:
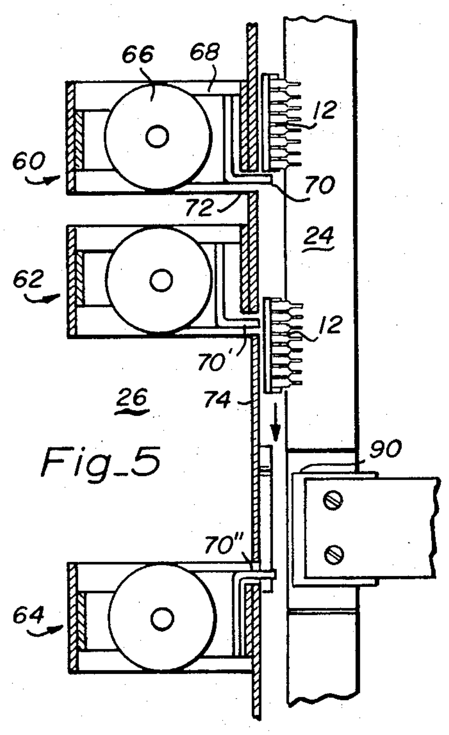
FIG. 5 is a side view illustrating an indexing mechanism of the type used in the embodiment of FIG. 2.
Figure 6:
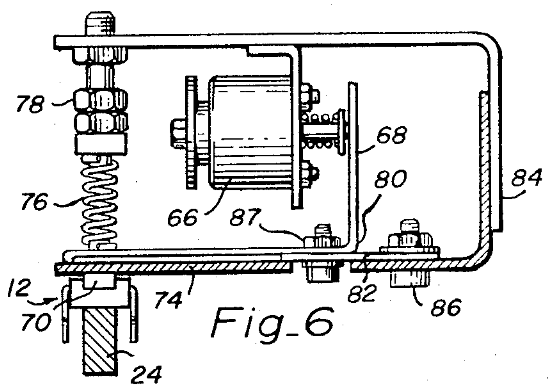
FIG. 6 is a top view further illustrating the indexing mechanism shown in FIG. 5.

Turning now to FIG. 5 of the drawing, the indexing mechanism 26, shown in the open position in FIG. 2, is shown in cross-section in the closed position. As indicated, the mechanism 26 includes an upper gating means 60, an intermediate gating means 62 and a lower gating means 64. Each of the gating means 60–64 includes an actuating solenoid 66 that drives an L-shaped gate 68 having a tab configured stop 70 which protrudes through an aperture 72 in the cover plate 74. As perhaps more clearly shown in FIG. 6 (top view), the gating means 60–64 also include a spring 76 which normally biases gate 68 into the closed position with tab 70 protruding into the DIP pathway as illustrated in FIG. 5, and an adjustable stop 78 for allowing the biasing force of spring 76 to be adjusted. Gate 68 is caused to pivot about the corner edge 80 as permitted by flex hinge 82. The supporting housing 84 for the gating means is suitably affixed to cover plate 74 my means of spot welds or other suitable fastening means.

The two upper gating means 60 and 62 serve as means for allowing one DIP at a time to drop downwardly along track 24. The lower gating means 64 serves as a stop for positioning a DIP 12 in alignment with the several contacts of a pair of testheads 90.

Figure 7:
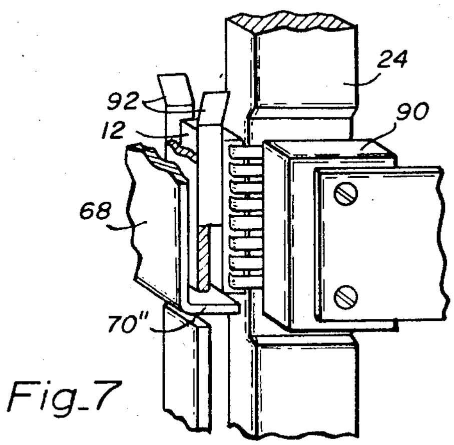
FIG. 7 is a partial perspective view further illustrating a portion of the indexing mechanism shown in FIG. 5.

In order to provide for precision vertical alignment of the gating means relative to the testheads 90, an adjusting screw 88 is provided (see FIG. 2) which permits the entire indexing assembly to be displaced either upwardly or downwardly to effect the desired vertical adjustment. The spacing between the inside face of cover plate 74 and track 24 may be adjusted by means of the adjustable stops 75 to accomodate DIPs of various body thicknesses. Also affixed to cover plate 74 are a pair of guides 92 which engage the upper side edges of each DIP 12 as it moves into the test position between testheads 90. The guides 92 serve to center the DIP on the track and prevent lateral movement during the test sequence. Note also in FIG. 5 and 7, that the track 24 is narrowed in the vicinity of the testheads 90 so as to insure that no electrical contact is made between the leads of DIP 12 and the metallic track 24. Alternatively, a dielectric track segment could be inserted between the heads 90, or a pair of dielectric segments could be positioned in the depressed portions of track 24 to serve the same purpose.

Figures 8, 9, 10:
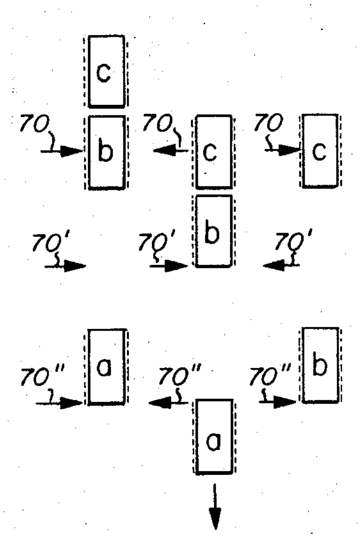
FIGS. 8–10 are three diagrams illustrating the indexing sequence of the indexing mechanism shown in FIG. 5.

The operational sequence of gating means 60–64 is illustrated by the three diagrams of FIGS. 8–10. In these diagrams the rectangles *a*, *b*, and *c* indicate three DIPs disposed in series along track 24, and the arrows 70 correspond to the relative positioning of the various gating tabs 70, 70', and 70''. With DIP *a* in the test position, all three gating means will be de-energized so that all three gating tabs project into the DIP pathway to either engage a DIP or block the pathway. Note in the sequence of FIG. 8, DIP *a* is held in the test position by tab 70'', and tab 70 engaged DIP *b* to prevent it and DIP *c* from moving downwardly. Following the testing of DIP *a*, gating means 62 is left de-energized while gating means 60 and 64 are energized to move the tabs 70 and 70'' out of the DIP pathway, allowing DIP *a* to drop out of the test position and allowing DIPs *b* and *c* to drop downwardly until DIP *b* engages tab 70'. A short time thereafter sufficient to allow DIP *a* to completely clear tab 70'', gating means 60 and 64 are de-energized while gating means 62 is simultaneously energized. This enables DIP *b* to drop down into the test position but causes DIP *c* to be held in the indicated position as shown in FIG. 10. DIP *b* may then be tested and the sequence repeated until all of the DIPs have been tested.

Figure 11:
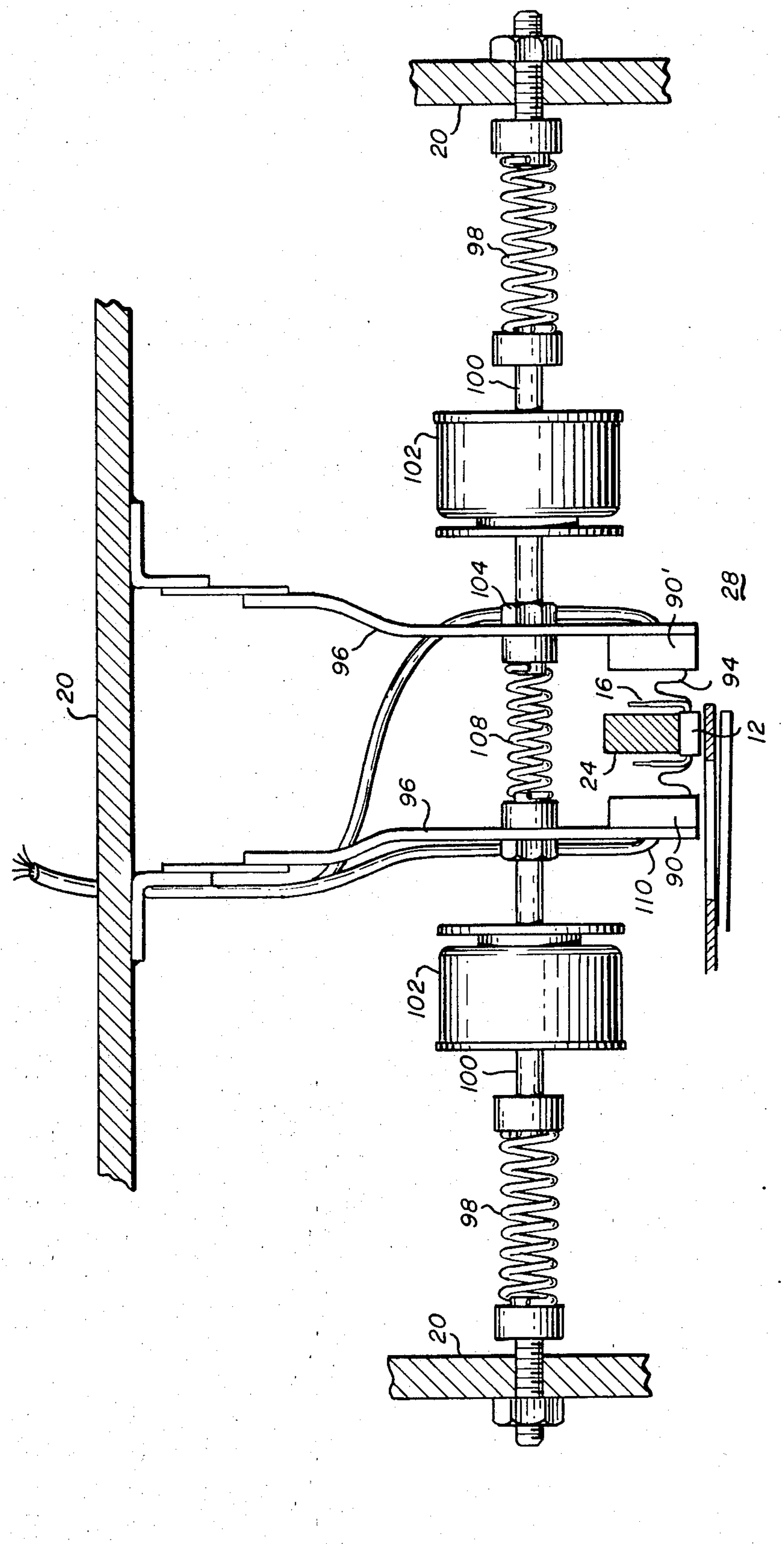
FIG. 11 is an illustration showing the testhead mechanism depicted in the preferred embodiment of FIG. 2.

In FIG. 11 of the drawing, a top view of the testhead mechanism 28 is shown to include a pair of testheads 90 that are positioned on opposite sides of track 24 and themselves include, as more clearly shown in FIG. 2, eight electrical contractors 94 which are equally spaced and aligned to correspond with the DIP leads 16 of DIP 12 which is shown in the test position. The heads 90 are carried by a pair of head support arms 96 which are hingedly affixed to a wall of chassis 20.

Heads 90 are normally biased into the illustrated DIP engaging position by a pair of compression springs 98 which have one end affixed to the chassis and the other end affixed to ends of the armatures 100 of solenoids 102. The opposite ends of the armatures 100 engage the outside wall of the arm 96 at 104. A third compression spring 108 combined with all the contactors 94 provides a resilient stop for terminating the inward travel of the heads 90 as they engage a DIP 12 to be tested. Spring 108 also serves to move heads 90 away from DIP 12 when solenoids 102 are energized. The spring force exerted by 108 is somewhat less than the combined spring force of the springs 98 so that with the solenoids 102 de-energized the contactors 94 of heads 90 are driven into engagement with the DIP leads 16.

To break contact with the DIP, the solenoids are simutaneously actuated so that their armatures are driven outwardly from the illustrated position, allowing spring 108 to separate heads 90 from engagement with the DIP 12. As solenoids 102 are de-energized, springs 98 again overcome the force of spring 108 causing the heads 90 to move toward the DIP 12. Since the contactors 94 are resilient, a slight wiping contact is effected as the contactors 94 engage the DIP leads 16. Note that since solenoids 102 are de-energized during the test period, no spurous magnetic noise is introduced by the solenoids during the test operation.

The test leads 110 coupled to heads 90 are brought out to a standard connector (not shown) so that the signal/response interface may be conveniently made. The illustrated design results in a minimum of noise at the test sight and therefore permits high frequency testing of the DIP packaged component.

Figure 12:
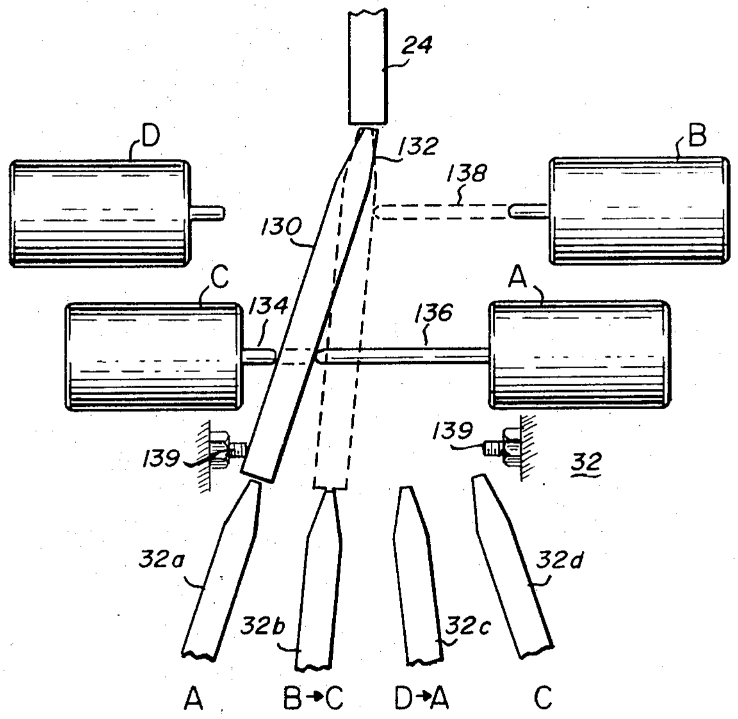
FIG. 12 is a diagrammatic representation of the sorting mechanism used in the preferred embodiment shown in FIG. 2.

When a test sequence for a particular DIP has been completed and solenoids 102 are energized to disengage head 90 from engagement with DIP 12, the gating means 64, as illustrated previously, is also actuated to allow DIP 12 to drop out of the test position and proceed along the track 24. As this occurs, the control logic illustrated generally by the box 120 in FIG. 2 causes the sorting mechanism 30, illustrated more specifically in FIG. 12, to route the DIP to a particular one of the output magazines 10''. The sorting mechanism enables each DIP to be deposited into one of the four output magazines 10'' depending upon the results of the test operation. For example, in the illustrated embodiment DIPs may be sorted into four categories.

This embodiment includes four solenoid actuators A, B, C, and D and a short segment of selector track 130 having one end pivoted at a point 132 proximate the lower end of main track 24. The positioning of selector track 130 into alignment with one of the output tracks 32 is accomplished by actuating one or more of the solenoids A–D. As may be noted from the drawing, an adjustable stop 139 serves to align selector track 130 with output track 32*a* when track 130 is driven into that position by the armature 136 of solenoid A. Likewise, the other stop 139 serves to align track 130 with output track 32*d* when only solenoid C is actuated. Solenoid B is positioned above and slightly to the right of solenoid A so that when it is energized and its armature 138 is fully extended it acts as a stop for aligning selector track 130 with output track 32*b*. The subsequent actuation of solenoid C causes section 130 to be rotated into that position. Note that since the actuating forces of the solenoids are equivalent solenoid C will not overcome the force exerted on armature 138 by solenoid B and as a result, the desired positioning of track section 130 is achieved. Similarly, by actuating solenoid D and then solenoid A, track section 130 can be aligned with output track 32*c*, and by actuating solenoid C along, section 130 can be rotated into alignment with output track 32*d*.

In addition to the aforementioned structure, the preferred embodiment also includes certain additional components. For example, a light source is embedded in track 24 at point 24 (see FIG. 2) and a photo-detector 27 is carried by coverplate 74. The output of photo-detector 27 is fed into the control logic 120 to indicate passage thereby of the last DIP input from one of the input magazines 10'. A similar light source 29 and photo-detector 31 are provided in each of the output tracks 32 for indicating, in one instance, passage of a DIP into one of the output magazines, and for indicating in another instance when a particular magazine is filled to capacity. Note that the photo-detectors 31 are located above those parts of the output tracks 32 which extend into the ends of the output magazines 10''.

Also included in the illustrated preferred embodiment is a solenoid actuated mechanism 140 having an armature plate 142 for engaging the leads of DIPs positioned along track 24. Solenoid 140 is actuated when the latch button 144 is depressed to release the latch 146 which allows cover plate 74 to be swung into the illustrated open position. This of course, allows cover plate 74 to be opened for inspection at any time prior to the completion of a test run. The control knobs and various switches used to select the operative mode of the apparatus, as well as several indicators, are positioned in a panel 150 disposed on the front slanting face of chassis 20. The output magazines 10'' are held in position by suitable connecting means 152 which permit any of the various magazines to be individually removed and replaced without disturbing the other magazines.

Referring now to the several figures collectively, the operation of the preferred embodiment of the handling apparatus will be described. The apparatus is initially made ready by inserting two input magazines 10' into position above the input magazine selector 22 and by positioning four output magazines in position beneath the output tracks 32. With the test and control logic 120 appropriately connected and energized, the particular operational test and sorting mode is selected by use of the dial 154. Insertion of input magazine 10' onto the unblocked track stub 42 will allow the DIPs contained therein to move down selector track 48 and onto track 24 where the first DIP will be stopped as it engages the first gate 60 which is normally closed. Note that as indicated above, the selector 22 is always in position to select either one or the other of the two input magazines 10'.

With the first several DIPs positioned on track 24, light from lamp 25 to photo-detector 27 is interrupted, and upon sensing this condition the test and control logic 120 permits the test sequence to be initiated by the operators actuation of a start switch. When the operation is started, gating mechanisms 60 and 64 are energized to withdraw the stops 70 and 70'' and allow the first several DIPs to drop down until the first DIP engages the stop 70'. Thereafter, gating mechanisms 60 and 64 are de-energized so that stops 70 and 70'' are allowed to re-enter the track passageway, the testhead mechanism 28 is energized to withdraw testheads 90 away from track 24, and gating mechanism 62 is actuated to allow the first DIP to drop into place between the testheads 90. The solenoids 102 of testhead mechanism 28 are then de-energized to allow testheads 90 to be driven into engagement with the DIP positioned therebetween. Logic 120 immediately thereafter causes the DIP to be tested.

Depending upon the results of the test, logic 120 will cause one or two of the solenoids A–D of sorting mechanism 30 to be energized to position the track section 130 into alignment with one of the output tracks 32. Simultaneously, solenoids 102 will again be energized to retrack the testheads and gating means 60 and 64 will be energized to allow the tested DIP to drop down along the track 24, selector track 130, and the selected output track 32 and thence into one of the output magazines 10''. Thereafter, gating means 60 and 64 are again de-energized and gating means 62 is energized to allow the next DIP to drop into the test position. Next, solenoids 102 are de-energized to allow the testhead 90 to engage the second DIP and the test sequence is repeated if the passage of the previously released DIP has been detected in one of the output magazines by photo-detector 31.

This sequence will continue until the upper photo-detector 27 senses passage of the last DIP originally contained in the selected magazine. At this point the appropriate actuator solenoid of magazine selector 22 is energized to cause track section 48 to swing into position in alignment between the other track stub 42 and track 24, thereby enabling the DIPs contained in the second input magazine to be loaded onto track 24. Now the empty magazine 10' should be replaced by a full one and all the operator need do is remove that magazine and insert a new full one. Note that the masking flange 50 will prevent the DIPs contained in the substituted magazine from exiting the magazine until that particular magazine is selected for discharge.

The above described operational sequence will continue until one of the output magazines is filled, as detected by one of the photo-detectors 31, and an indicator light on panel 150 is correspondingly lit. When this occurs the operator merely removes the filled output magazine and replaced it with another.

The present embodiment is easily interfaced with most functional and parametric digital circuit testers having closed-loop operating controls and GO NO-GO or classification signals. The handling apparatus is particularly suited for production testing, incoming inspection or particular sampling operations where lower cost per unit throughout can be obtained. The apparatus is highly reliable and as pointed out above, device operation is supervised by an internal control system which monitors the mechanical function of the device through the use of photo-detectors. Furthermore, the apparatus permits very light handling of the DIPs even though providing for good physical connection between the testhead contacts and the DIP leads. The illustrated embodiment is limited to testing DIPs having 16 or less leads, however, it will be appreciated that by simply interchanging the testheads 90, the handler can be made capable of sorting the larger DIPs as well.

Although the present invention has been described above in terms of a specific preferred embodiment, it is contemplated that after having read this disclosure, many alterations and modifications may become apparent to one of ordinary skill in the art. Accordingly, this disclosure is not to be taken as limiting and the appended claims are to be interpreted as covering all such alterations and modifications as fall within the true spirit and scope of the invention.

What is claimed is:

1. Apparatus for sorting packaged electronic components having a generally rectangular shaped body with a plurality of electrical conductors extending downwardly from two opposite sides thereof, comprising:

a first input magazine for containing a plurality of said components;

an elongated track forming a passageway for serially receiving said components at one end, transporting said components in astraddle fashion, and discharging said components at the opposite end;

a test mechanism disposed along said track for engaging the electrical conductors of a component located along said track at a test position and applying test signals thereto;

an indexing mechanism disposed along said track for sequentially locating said components at said test position;

a plurality of output magazines for receiving tested components discharged from the opposite end of said track;

a sorting mechanism disposed between said opposite end of said track and said magazines for selectively transporting each of said components to a particular output magazine; and logic means for applying test signals through said contactors to the components engaged thereby and operative to determine certain characteristics thereof, and for developing signals for controlling said indexing mechanism, said test mechanism and said sorting mechanism.

2. Apparatus as recited in claim 1 wherein said test mechanism includes a first testhead disposed on one side of said track.

3. Apparatus as recited in claim 2 wherein said first and second testheads are disposed in aligned facing relationship to each other and each testhead includes a plurality of electrical contactors, said test mechanism further including first means for moving said first and second testheads toward said track so that said electrical contactors engage the electrical conductors of a component located at said test position, and second means for moving said testheads away from said track.

4. Apparatus as recited in claim 3 wherein said first means includes a pair of spring members positioned to bias said testheads toward each other.

5. Apparatus as recited in claim 4 wherein said second means includes electro-mechanical means for moving said testheads away from each other against the biasing forces applied by said spring members.

6. Apparatus as recited in claim 1 wherein said indexing mechanism includes at least two electro-mechanically actuated stop means for alternately blocking said passageway and locating said components one at a time in said test position.

7. Apparatus as recited in claim 1 wherein said indexing mechanism includes first, second and third electro-mechanically actuated stop means disposed in series along said truck, said first and third stop means being simultaneously actuated and said second stop means being actuated alternatively with said first and third stop means whereby said components are caused to sequentially move into said test position.

8. Apparatus as recited in claim 1 wherein said plurality of output magazines includes at least four separate output magazines, said sorting mechanism includes a pivotable track section and four electrical actuators disposed to selectively move said track section into alignment between said opposite end of said track and one of said output magazines.

9. Apparatus as recited in claim 1 and further comprising a second input magazine, and an input selector mechanism for enabling one of said first and second input magazines to discharge the components contained therein onto said track.

10. Apparatus as recited in claim 9 wherein said input selector mechanism includes a pivotable track section for selectively connecting one of said input magazines and said one end of said track.

11. Apparatus for sorting packaged electronic components having a generally rectangular shaped body with a plurality of electrical conductors extending downwardly from two opposite sides thereof, comprising:

first and second input magazines for containing a plurality of said components;

a plurality of output magazines for variously receiving said components;

track means for transporting said components in astraddle fashion from said input magazines to said output magazines, said track means including;

a main track;

a selector mechanism responsive to first signals and operative to couple one of said first and second magazines to one end of said main track so that the components contained therein are serially discharged onto said main track; and a sorting mechanism responsive to a second signals and operative to couple the other end of said track to one of said output magazines;

an indexing mechanism responsive to third signals and operative to locate one of the components transported by said track at a test position along said track;

a testhead mechanism disposed adjacent to said test position, said testhead mechanism being responsive to fourth signals and operative to engage said one component to electrically energize said one component and receive electrical response signals therefrom;

detector means disposed at various positions along said track for detecting the passage of components thereby and operative to develop component signals; and logic means responsive to said component signals and said response signals and operative to develop said first, second and third and fourth signals, whereby said components are caused to be sorted and collected in said output magazines according to certain operative characteristics thereof.

12. Apparatus as recited in claim 11 wherein said plurality of output magazines includes at least four separate output magazines, said sorting mechanism includes a pivotable track section and four electrical actuators disposed to selectively move said track section into alignment between said opposite end of said track and one of said output magazines.

13. Apparatus as recited in claim 11 wherein said indexing mechanism includes first, second and third electro-mechanically actuated stop means disposed in series along said track, said first and third stop means being simultaneously actuated and said second stop means being actuated alternatively with said first and third stop means whereby said components are caused to sequentially move into said test position.

14. Apparatus as recited in claim 11 wherein said test mechanism includes a first testhead disposed on one side of said track.

15. Apparatus as recited in claim 14 wherein said first and second testheads are disposed in aligned facing relationship to each other and each testhead includes a plurality of electrical contactors, said test mechanism further including first means for moving said first and second testheads toward said track so that said electrical contactors engage the electrical conductors of a component located at said test position, and second means for moving said testheads away from said track.

16. Apparatus as recited in claim 15 wherein said first means includes a pair of spring members positioned to bias said testheads toward each other.

17. Apparatus as recited in claim 16 wherein said second means includes electro-mechanical means for moving said testheads away from each other against the biasing forces applied by said spring members.

18. Apparatus as recited in claim 11 wherein said indexing mechanism includes at least two electro-mechanically actuated stop means for alternately blocking said passageway and locating said components one at a time in said test position.

19. Apparatus as recited in claim 11 and further comprising a chassis for supporting the previously recited elements, a cover plate hingedly affixed to said chassis and moveable between an open position and a closed position, when in said closed position said cover plate being separated from said track by a selected distance to provide a passageway for said components, and adjustable stop means for determining said distance.

* * * * *